J. SAXTON.
Hydrometer.
No. 44,460.
Patented Sept. 27, 1864.
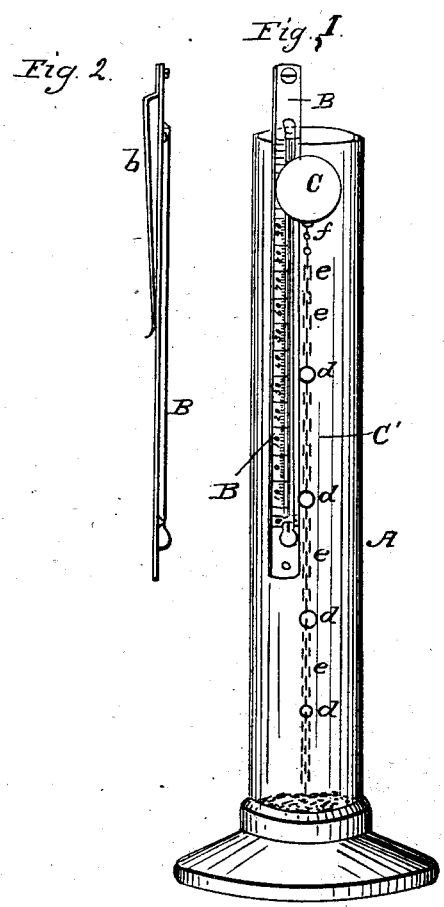

UNITED STATES PATENT OFFICE.

JOSEPH SAXTON, OF WASHINGTON, DISTRICT OF COLUMBIA.

IMPROVEMENT IN HYDROMETERS.

Specification forming part of Letters Patent No. 44,460, dated September 27, 1864.

*To all whom it may concern:*

Be it known that I, JOSEPH SAXTON, of the city of Washington, in the District of Columbia, have invented a new and useful Improvement in Hydrometers; and I do hereby declare that the following is a full, clear, and exact description thereof, reference being had to the accompanying drawing, making part of this specification, and in which my invention is shown as used with Fahrenheit's thermometer.

Two forms of hydrometers are now principally used for commercial and technical purposes, and both are extremely objectionable. One form of instrument is always immersed to the same point by means of removable weights, which require careful adjustment, are liable to be injured from being wet, and to be lost or misplaced, and they cannot be used with sufficient promptness. The other instrument consists of a tube terminating in a bulb made of glass or metal, and necessarily so thin as to be extremely fragile; and, besides this, if the fluid does not readily adhere to the instrument its surface exerts a certain amount of resistance to the sinking, which may keep the instrument above its proper level, which would happen should the bulb and tube become soiled or greasy from being handled, while if washed with certain solutions it might enter so deep as to accumulate and retain portions of the liquid upon the tube. Again, the tube, in which the scale is placed when the instrument is made of glass, is seldom of perfectly uniform diameter, and any departure therefrom must in some measure affect the register of the instrument, and all these causes of variation combined render the instrument less accurate than its readings would indicate.

Now, it is the object of my invention to obviate all these objections, and furnish an instrument which shall unite the advantages of the weight without requiring a separate adjustment, with a strictly accurate register; and to this end my invention consists in the use of a float of any material that will not sink in the lightest liquids to be tested, and attaching thereto a chain of graduated links, so that the specific gravities of the constituents to be measured, or the percentage of any substance present, which may affect these specific gravities, may be determined by the number of the links of the chain suspended in the fluid, or by the number of the links that may remain in repose at the bottom thereof.

To enable others skilled in the art to make and use my invention, I will proceed to describe its construction and operation.

In the accompanying drawing, I have shown at A a glass receiving-vessel to contain the liquid to be tested with a thermometer, B, inserted in the liquid, and attached to the vessel in a vertical position, and held in place by a spring, $b$, to determine the temperature at the moment of the test. I now construct a spherical bulb, C, of any material that will float lightly in any liquid, and to this I attach a hook, $a$. As this hook makes the point on the bulb to which it is attached the heaviest, it will always, when placed in the liquid to be tested, remain centrally under the sphere. To this hook I now suspend the greatest length of suitable wire that the bulb will float in the heaviest liquid to be tested, and this wire is then divided into lengths more or less minute, according to the particular use for which the hydrometer is designed. I then form the divided portions of the wire into separate links, and unite these links into a chain, C′, as seen in the drawing, the links varying in form as desired to designate determined numbers, so that they may be readily seen and counted through the receiving-vessel. For example, the wire suspended by the bulb in the fluid may be divided into one hundred equal parts, to be formed into the same number of links, every tenth one being made of a different form, as shown at $d$ in the drawing, from those marked $e$, and all united in a continuous chain, C′, which is attached to the bulb by the hook $f$, which may be made of one of the hundred pieces, and will, of course, be the equivalent in weight to the separate links made from the remaining pieces of the wire. Now, it is manifest that the fluid in the receiving-vessel will suspend by the bulb C more or fewer of these links of the chain, in proportion to its specific gravity at a uniform temperature. Thus the whole of the chain may be suspended in the liquid or a portion of it may rest on the bottom of the receiving-vessel, and the specific gravity will be alike determined by the number of links suspended and by the number at rest.

It is obvious that the value of each link may be determined either by construction, by calculation, or by experiment, and that to determine the specific gravity at a glance and with precision it will only be required to count the divisions of the chain by the differently-formed links that mark them, and thus determine the number of links suspended or the number at rest.

When it is the object to obtain directly the percentage of one of the constituents of any liquid dependent upon its specific gravity, I propose to proportion the length of the links so that they may directly determine this proportional part. For example, to determine the percentage of alcohol in a spirituous liquid I would so proportion the links that each one should represent one per cent. of alcohol, so that if the whole chain were suspended it would represent pure distilled water at 60° Fahrenheit. Now, of course, if the whole chain were at the bottom, and only the hook and bulb suspended it would indicate pure alcohol at 60° Fahrenheit, and thus the suspension of any number of links will at once determine the percentage of alcohol of any spirituous liquid tested by the instrument in the receiving-vessel.

In the drawings the position of the bulb and chain indicate forty-nine per cent. of alcohol in the liquid. It is obvious that in such a division of the chain no inconvenience can arise from requiring too long a receiving-vessel, for the chain may be looped to the hook $f$ to any extent required, or some of the links may have the form of hooks and receive loops of the chain until it is short enough to use in a small receiving-vessel—such as A in the drawings—for the weight and displacement of the chain is a constant.

The metal of which the chain may be made can have relation to the uses for which the instrument may be required—as, if a large number of links be required to give minute degrees, aluminum will answer a good purpose, and, for the smallest number of degrees, platinum may be found advantageous.

In the use of all known hydrometers it is necessary to make corrections for variations of temperature, and mine is, of course, subject to the same law.

What I claim as my invention, and desire to secure by Letters Patent of the United States, is—

The hydrometer composed of a floating bulb and an attached chain of graduated links to determine and indicate the specific gravities of liquids or the percentage of alcohol they may contain, substantially in the manner set forth.

In testimony whereof I have hereunto subscribed my name.

JOS. SAXTON.

Witnesses:
   JOHN S. HOLLINGSHEAD,
   GEO. R. ADAMS.